US008604137B2

(12) United States Patent
Grootaert et al.

(10) Patent No.: US 8,604,137 B2
(45) Date of Patent: Dec. 10, 2013

(54) PERFLUOROELASTOMERS WITH LOW CARBONYL ENDGROUP RATIOS

(75) Inventors: Werner M. A. Grootaert, Oakdale, MN (US); Kai H. Lochhaas, Neuoetting (DE)

(73) Assignee: 3M Innovative Properties Company, St. Paul, MN (US)

(*) Notice: Subject to any disclaimer, the term of this patent is extended or adjusted under 35 U.S.C. 154(b) by 402 days.

(21) Appl. No.: 12/919,783

(22) PCT Filed: Feb. 2, 2009

(86) PCT No.: PCT/US2009/032850
§ 371 (c)(1), (2), (4) Date: Aug. 27, 2010

(87) PCT Pub. No.: WO2009/111120
PCT Pub. Date: Sep. 11, 2009

(65) Prior Publication Data
US 2011/0009569 A1   Jan. 13, 2011

Related U.S. Application Data

(60) Provisional application No. 61/032,499, filed on Feb. 29, 2008.

(51) Int. Cl.
C08F 8/40 (2006.01)
C08F 4/32 (2006.01)

(52) U.S. Cl.
USPC ........... 525/340; 525/357; 525/375; 526/222; 526/227; 526/247

(58) Field of Classification Search
USPC ........... 525/340, 357, 375; 526/222, 227, 247
See application file for complete search history.

(56) References Cited

U.S. PATENT DOCUMENTS

| | | |
|---|---|---|
| 2,567,011 A | 9/1951 | Diesslin |
| 2,732,398 A | 1/1956 | Brice |
| 2,809,990 A | 10/1957 | Brown |
| 4,000,356 A | 12/1976 | Weisgerber |
| 4,281,092 A | 7/1981 | Breazeale |
| 4,588,796 A | 5/1986 | Wheland |
| 4,621,116 A | 11/1986 | Morgan |
| 5,268,405 A | 12/1993 | Ojakaar |
| 5,285,002 A | 2/1994 | Grootaert |
| 5,442,097 A | 8/1995 | Obermeier |
| 5,565,512 A | 10/1996 | Saito |
| 5,621,145 A | 4/1997 | Saito |
| 5,639,837 A | 6/1997 | Farnham |
| 5,677,389 A | 10/1997 | Logothetis |
| 5,700,879 A | 12/1997 | Yamamoto |
| 5,767,204 A | 6/1998 | Iwa |
| 5,789,489 A | 8/1998 | Coughlin |
| 5,789,509 A | 8/1998 | Schmiegel |
| 5,877,264 A | 3/1999 | Logothetis |
| 5,936,060 A | 8/1999 | Schmiegel |
| 6,114,452 A | 9/2000 | Schmiegel |
| 6,211,319 B1 | 4/2001 | Schmiegel |
| 6,281,296 B1 | 8/2001 | MacLachlan |
| 6,429,258 B1 | 8/2002 | Morgan |
| 6,613,941 B1 | 9/2003 | Felix |
| 6,657,012 B2 | 12/2003 | Grootaert |
| 6,657,013 B2 | 12/2003 | Grootaert |
| 6,706,193 B1 | 3/2004 | Burkard |
| 6,794,457 B2 | 9/2004 | Grootaert |
| 6,794,550 B2 | 9/2004 | Hintzer |
| 6,812,310 B2 | 11/2004 | Grootaert |
| 6,825,300 B2 | 11/2004 | Grootaert |
| 6,844,388 B2 | 1/2005 | Grootaert |
| 6,846,880 B2 | 1/2005 | Grootaert |
| 6,890,995 B2 | 5/2005 | Kolb |
| 7,018,541 B2 | 3/2006 | Hintzer |
| 7,294,677 B2 | 11/2007 | Grootaert |
| 2002/0145228 A1 | 10/2002 | Kolb |
| 2004/0024134 A1 | 2/2004 | Grootaert |
| 2004/0044139 A1 | 3/2004 | Grootaert |
| 2004/0132939 A1 | 7/2004 | Kaspar |
| 2006/0199898 A1 | 9/2006 | Funaki |
| 2006/0223924 A1 | 10/2006 | Tsuda |
| 2006/0281946 A1 | 12/2006 | Morita |
| 2007/0015864 A1 | 1/2007 | Hintzer |
| 2007/0015865 A1 | 1/2007 | Hintzer |
| 2007/0049698 A1 | 3/2007 | Grootaert |
| 2007/0060699 A1 | 3/2007 | Tsuda |
| 2007/0117915 A1 | 5/2007 | Funaki et al. |
| 2007/0142513 A1 | 6/2007 | Tsuda |
| 2007/0142541 A1 | 6/2007 | Hintzer |

FOREIGN PATENT DOCUMENTS

| | | |
|---|---|---|
| EP | 0 661 304 | 7/1995 |
| EP | 0 769 521 | 4/1997 |
| EP | 0 784 064 | 7/1997 |

(Continued)

OTHER PUBLICATIONS

Pianca et al., Journal of Fluorine Chemistry 95 (1999) 71-84.*
Hu, "Reaction of Perfluoroalkanesulfinates with Allyl and Propargyl Halides. A Convenient Synthesis of 3-(Perfluoroalkyl) prop-1-enes and 3-(Perfluoroalkyl) allenes," J. Org. Chem. 1991, 56, pp. 2801-2804.
Huang, "The Reaction of Perfluoroalkanesulfinates VII. Fenton Reagent-Initiated Addition of Sodium Perfluoroalkanesulfinates to Alkenes," Chinese Journal of Chemistry, 1992, vol. 10 No. 4, pp. 365-372.
Huang, "The Reaction of Perfluoroalkanesulfinates. IX. Perfluoroalkylation of Pyridine and its Derivatives with Sodium Perfluoroalkanesulfinates," Journal of Fluorine Chemistry, 1995, 71, pp. 51-54.
Logothetis, "Chemistry of Fluorocarbon Elastomers," Prog. Polym. Sci., 1989, vol. 14, pp. 251-296.

(Continued)

Primary Examiner — Robert D. Harlan
(74) Attorney, Agent, or Firm — Julie Lapos-Kuchar

(57) ABSTRACT

A composition and method of making having a perfluoroelastomer gum with a nitrogen-containing cure site and an end group represented by $-CF_3$, $-CF_2H$, $-CFH_2$, and/or $-CH_3$, and having a low carbonyl-containing end group ratio, which yield cured fluoroelastomers with improved retained sealing force and articles therefrom.

21 Claims, No Drawings

(56) References Cited

FOREIGN PATENT DOCUMENTS

| | | | |
|---|---|---|---|
| EP | 0 661 304 B1 * | 10/1997 | ............ C08F 214/18 |
| EP | 1153976 | 11/2001 | |
| WO | WO 97/23440 | 7/1997 | |
| WO | WO 98/23653 | 6/1998 | |
| WO | WO 98/23654 | 6/1998 | |
| WO | WO 98/23655 | 6/1998 | |
| WO | WO 00/09569 * | 2/2000 | |
| WO | WO 2004/011510 | 2/2004 | |
| WO | WO 2007/082867 | 7/2007 | |

OTHER PUBLICATIONS

Pellerite, "Unusual Reaction Chemistry in Thermal Decomposition of Alkali Metal 2-Alkoxy-2, 3, 3, 3-Tetrafluoropropionate Salts," Journal of Fluorine Chemistry, 1990, 49 pp. 43-66.

Pianca, "End Groups in Fluoropolymers," Journal of Fluorine Chemistry, 1999, vol. 95, pp. 71-84.

Search Report for PCTUS2009-032850, 5 pages.

Tuckner, SAE Technical Paper Series 2000-01-0752, "Compression Stress Relaxation Test Comparisons and Development", Mar. 6-9, 2000, 10 pages.

Tuckner, SAE Technical Paper Series 2001-01-0742, "Compression Stress Relaxation Testing Comparisons, Methods, and Correlations", Mar. 5-8, 2001, 9 pages.

Tuckner, SAE Technical Paper Series 2003-01-0946, "The Effects of Configuration on Sealing Force Measurement and Compression Stress Relaxation Response", Mar. 3-6, 2003, 8 pages.

Written Opinion for PCTUS2009-032850, 6 pages.

* cited by examiner

PERFLUOROELASTOMERS WITH LOW CARBONYL ENDGROUP RATIOS

CROSS REFERENCE TO RELATED APPLICATIONS

This application is a national stage filing under 35 U.S.C. 371 of PCT/US2009/032850, filed Feb. 2, 2009, which claims priority to U.S. Provisional Application No. 61/032,499, filed Feb. 29, 2008, the disclosure of which is incorporated by reference in its/their entirety herein.

TECHNICAL FIELD

This invention relates to compositions and methods of making a fluoropolymer having a perfluoroelastomer gum with a nitrogen-containing cure site and a methyl end group having a low ratio carbonyl-containing end groups, which yield cured fluoroelastomers with improved retained sealing force and articles therefrom.

BACKGROUND

Because elastomers can be used in sealing applications, it is important that the elastomers perform well under compression. Compressive sealing is based on the ability of an elastomer to be easily compressed and develop a resultant force that pushes back on the mating surfaces. The ability of a material to maintain this resultant force as a function of time over a range of environmental conditions is important to long term stability. As a result of thermal expansion, stress relaxation and thermal aging, the initial sealing forces will decay over time. By determining the retained sealing force, elastomeric materials can be evaluated for their sealing force retention under a range of conditions.

Cured fluoroelastomers (also known as FKM's, or fluorocarbon elastomers containing vinylidene fluoride and hexafluoropropylene) are particularly useful as seals, gaskets, and molded parts in systems that are exposed to elevated temperatures and/or corrosive materials, such as in automotive, chemical processing, semiconductor, aerospace, and petroleum industry applications, among others. For sealing applications that require resistance to the most extreme conditions, cured perfluoroelastomers are used. However, cured perfluoroelastomers (also known as FFKM's or cured perfluorocarbon elastomers) traditionally have shown poor retained sealing force as compared to conventional FKM or FKM compounds.

SUMMARY

In some embodiments, it is desirable to provide a perfluoroelastomer composition that has good retained sealing force.

Briefly, in one embodiment, the present disclosure provides a composition comprising a perfluoroelastomer gum having a nitrogen-containing cure site and an end group represented by $-CF_3$, $-CF_2H$, $-CFH_2$, and/or $-CH_3$, wherein the integrated absorbance ratio of carbonyl-containing end groups of the perfluoroelastomer gum is less than 0.08.

In another embodiment, the present disclosure provides an article comprising the cured composition of a perfluoroelastomer gum having a nitrogen-containing cure site and an end group represented by $-CF_3$, $-CF_2H$, $-CFH_2$, and/or $-CH_3$, wherein the integrated absorbance ratio of carbonyl-containing end group of the perfluoroelastomer gum is less than 0.08.

In yet another embodiment, the present disclosure discloses a method of making a fluoropolymer by polymerizing at least one perfluorinated monomer and a nitrogen-containing cure site monomer in the presence of a suitable initiator, and optionally, an anion selected from a chloride anion, a cyanate anion, a thiocyanate anion, or combinations thereof.

The above summary is not intended to describe each embodiment. The details of one or more embodiments of the invention are also set forth in the description below. Other features, objects, and advantages will be apparent from the description and from the claims.

DETAILED DESCRIPTION

The compositions of this disclosure include polymers comprising a perfluoroelastomer gum having an end group represented by at least one of the following: $-CF_3$, $-CF_2H$, $-CFH_2$, and $-CH_3$, and a low ratio of carbonyl-containing end groups. By carbonyl-containing end groups is meant carboxyl groups, carboxylate groups, carboxamide groups, or mixtures thereof. For purposes of this disclosure, carbonyl-containing functional groups do not include esters, aldehyde or ketone groups. By end group, is meant for purposes of this disclosure, the portion of the polymer where polymerization initiates or terminates. By low ratio, this means the amount of carbonyl-containing end groups in the perfluoroelastomer gum is less than 0.08, less than 0.05, or even less than 0.01. For purposes of this disclosure, a perfluoroelastomer is considered a material essentially made from perfluorinated monomers (i.e., greater then 95 mole % is perfluorinated). The polymerized perfluoroelastomer may have end groups that are not perfluorinated because the end groups are dependent on the initiator system or chain transfer agent that is used. In this disclosure perfluorinated, partially fluorinated and nonfluorinated initiator systems and chain transfer agents are considered.

Polymers of this disclosure comprise perfluoroelastomers gums and cured perfluoroelastomers. As used herein, the terms "perfluoroelastomer" and "perfluoroelastomer gum" are used interchangeably and refer to amorphous perfluorocarbon polymers that are capable of being crosslinked, hereby generating perfluorocarbon elastomers. Crosslinked perfluoroelastomer gums are interchangeably referred to herein as "cured perfluoroelastomers" or "cured compositions".

The present disclosure is directed to polymer compositions comprising a perfluoroelastomer gum having an end group represented by $-CF_3$, $-CF_2H$, $-CFH_2$, and/or $-CH_3$, and a low ratio of carbonyl-containing end groups. The perfluoroelastomer gum also contains a nitrogen-containing cure site. The composition may also include one or more conventional adjuvants, such as, for example, fillers, additives and curing agents.

It is generally known that cured perfluoroelastomers, while having certain physical properties which are excellent, such as tensile strength at break and modulus, also have certain critical physical properties, such as retained sealing force, which are poor. Without wishing to be bound by theory, it is believed that upon heat aging at elevated temperatures, carboxylate end groups in the cured perfluoroelastomers are a source of hydrogen fluoride and/or fluoride ions through decarboxylation. The hydrogen fluoride and/or fluoride ions are believed to degrade certain crosslink types such as triazine, benzoxazole or benzimidazole crosslinks, resulting in poor heat aged properties, such as increased compression set and lower retained sealing force.

The perfluorinated gums presently disclosed have end groups represented by $-CF_3$, $-CF_2H$, $-CFH_2$, and/or —CH$_3$ and a low ratio of carbonyl-containing end groups. These cured compositions exhibit unexpected results because the finished articles derived from these perfluorinated gums exhibit excellent physical properties, including retained sealing force and compression set.

Representative perfluoroelastomer gums include copolymerized units of a perfluoroolefin, a perfluorovinyl ether selected from the group consisting of perfluoro(alkyl vinyl) ether, and perfluoro(alkoxy vinyl) ether, and mixtures thereof. Representative perfluorinated olefins include tetrafluoroethylene (TFE) and hexafluoropropylene (HFP).

Suitable perfluorovinyl ethers are those of the formula

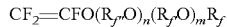

where $R_{f'}$ and $R_{f''}$ are independently linear or branched perfluoroalkylene groups of 2-6 carbon atoms, m and n are independently 0-10 and $R_f$ is a perfluoroalkyl group of 1-6 carbon atoms.

A preferred class of perfluoro(alkyl vinyl) ethers include compositions of the formula

where X is F or CF$_3$, n is 0-5, and $R_f$ is a perfluoroalkyl group of 1-6 carbon atoms. Preferred perfluoro(alkyl vinyl) ethers are those wherein n is 0 or 1 and $R_f$ contains 1-3 carbon atoms. Examples of such perfluorinated ethers include perfluoro(methyl vinyl) ether, perfluoro(ethyl vinyl) ether, and perfluoro(propyl vinyl) ether. Other useful monomer include compounds of the formula

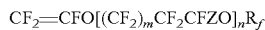

where $R_f$ is a perfluoroalkyl group of 1-6 carbon atoms, m=0 or 1, n=0-5, and Z=F or CF$_3$. Preferred members of this class are those in which $R_f$ is C$_3$F$_7$, m=0 and n=1. Other examples of useful perfluoro(alkyl vinyl) ethers include

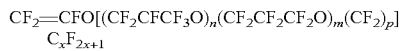

where m and n=1-10, p=0-3, and x=1-5. Preferred members of this class include compounds where n=0-1, m=0-1, and x=1.

Perfluoro(alkoxy vinyl) ethers may also be used. Examples of useful perfluoro(alkoxy vinyl) ethers include

where n=1-5, m=1-3 and where preferably, n=1.

Specific examples of useful perfluoro(alkyl vinyl) ethers include: CF$_2$=CFOCF$_3$, CF$_2$=CFOCF$_2$CF$_2$CF$_2$OCF$_3$, CF$_2$=CFOCF$_2$OCF$_2$CF$_2$CF$_3$, CF$_2$=CFOCF$_2$CF$_3$, CF$_3$CF$_2$OCF$_2$OCF=CF$_2$, CF$_2$=CFOCF$_2$CF$_2$OCF$_3$, and combinations thereof.

Mixtures of perfluoro(alkyl vinyl) ethers and perfluoro(alkoxy vinyl) ethers may also be used.

Preferred polymers are composed of TFE and at least one perfluoro(alkyl vinyl) ether as principle monomer units. In such polymers, the copolymerized perfluorinated ether units constitute from about 1-50 mole percent of total monomer units in the polymer. Examples of suitable principal monomers include perfluoroolefins (e.g., TFE and HFP), chlorotrifluoroethylene (CTFE), perfluorovinyl ethers (e.g., perfluoroalkyl vinyl ethers and perfluoroalkoxy vinyl ethers), and optionally, small amounts (i.e., in similar amounts to cure-site monomers) of perfluoroalkylbis olefins (e.g. CH$_2$(CF$_2$)$_6$CHCH$_2$)), 2H-pentafluoropropene, trifluoroethylene, vinylidene fluoride, or other hydrogen-containing monomers such as olefins (e.g., ethylene, propylene), and VDF.

In some embodiments, the fluoropolymer comprises block co-polymers or randomly co-polymerized (i.e., interpolymerized) monomer units derived from TFE, CTFE, and/or one or more ethylenically-unsaturated monomers represented by the formulas CF$_2$=CF—R$_f^1$, CF$_2$=CF—O—R$_f^2$, and CH$_2$=CR3$_2$, wherein R$_f^1$ is a perfluoroalkyl; R$_f^2$ is a perfluoroalkyl, or a perfluoroalkoxy; and each R3 is independently selected from H, F, Cl, Br, I, or an aliphatic group. In some embodiments, the perfluoroalkyl, perfluoroalkoxy, and aliphatic groups have F, Br, I, and/or Cl substituents.

In some embodiments, the fluoropolymer comprises at least two interpolymerized monomer units derived from TFE and at least one of a perfluorinated alkyl vinyl ether, perfluorinated alkoxyalkyl vinyl ether, perfluorinated alkenyl vinyl ether, or perfluorinated alkoxyalkenyl vinyl ether, respectively.

Chain transfer agents may be added to the perfluoroelastomer monomers during polymerization to control the molecular weight. Chain transfer agents may include for example, alkanes such as ethane and n-pentane, dialkyl ethers such as dimethyl ether, methyl tertiary butyl ether, thiols, or compounds having the formula R$_f$Br$_x$, wherein R$_f$ is an x-valent (per) fluoroalkyl radical C1-C12, optionally containing chlorine atoms, while x is 1 or 2. Chain transfer agents may also include perfluoroalkyl-chloride, bromide or iodides. Examples of suitable chain transfer agents include CF$_2$Br$_2$, Br(CF$_2$)$_2$Br, Br(CF$_2$)$_4$Br, CF$_2$ClBr, CF$_3$CFBrCF$_2$Br and the like. Further examples of suitable chain transfer agents include CH$_2$Br$_2$ and those disclosed in U.S. Pat. No. 4,000,356. Other suitable chain transfer agents are iodine containing chain transfer agents such as CH$_2$I$_2$, CF$_2$I$_2$, ICF$_2$CF$_2$CF$_2$CF$_2$I, CF$_3$I, CH$_3$I and the like.

The polymers can be prepared by polymerization of appropriate perfluoroelastomer monomer mixtures in the presence of a free radical generating initiator either in bulk, in solution in an inert solvent, in aqueous suspension, or in aqueous emulsion. Such polymerizations are usually carried out in an aqueous medium by feeding monomers under pressure into a stirred reactor and initiating the polymerization. The polymerization systems may comprise auxiliaries, such as buffers and, if desired, complex-formers or chain-transfer agents. The polymerization temperature may be from 10° C. to 180° C., typically 30° C. to 100° C. Polymerization pressures may be from 1 to 40 bar (0.1 to 4 MPa), typically 3 to 30 bar (0.3 to 3 MPa).

Initiator systems that may be used to initiate the free radical polymerization include initiator systems that generate free radicals through a redox reaction such as for example a combination of an oxidizing agent and a reducing agent (e.g., a perfluoroalkyl sulfinate and a suitable oxidizing agent capable of oxidizing the perfluoroalkyl sulfinate to a perfluoroalkyl sulfonyl radical, which subsequently generates a perfluoroalkyl radical). Suitable oxidizing agents for this purpose include persulfates, including for example, ammonium persulfate, potassium persulfate, and sodium persulfate. Other oxidizing agents such as bromate, chlorate and hypochlorite, as described in U.S. Pat. No. 5,639,837, may also be used. A particularly useful class of reducing agents are perfluoroalkyl sulfinates, but other reducing agents may also be present, such as a sulfite, e.g., sodium sulfite, sodium bisulfite; a metabisulfite, e.g., sodium or potassium bisulfite; pyrosulfites; and thiosulfates. Additionally, Na$_2$S$_2$O$_5$, and metal ions such as copper, iron, and silver may be used.

Halides and pseudo halides may be added to the initiating system in order to reduce the integrated absorbance ratio of the carbonyl-containing end group even further. These are described for instance in U.S. Pat. No. 6,812,310 and U.S. Pat. No. 6,825,300.

Fluorinated and hydrocarbon organic peroxides may also be used as initiators.

The amount of initiator employed is typically between 0.03% and 2% by weight, preferably between 0.05% and 1% by weight based on the total weight of the polymerization mixture. The full amount of initiator may be added at the start of the polymerization or the initiator can be added to the polymerization in a continuous way during the polymerization. Preferably the initiator is added until a conversion of monomer to polymer of 70% to 80% is achieved. One can also add part of the initiator at the start and the remainder in one or separate additional portions during the polymerization.

The polymerization can be a solvent polymerization or an emulsion polymerization. Solvent polymerization is typically done in non-telogenic organic solvents, for example, haloperfluoro or perfluoro liquids. Any soluble radical initiator can be used, for example bis(perfluoroacyl) peroxides. The polymerization is typically run at a temperature in the range of 25 to 80° C. and at a pressure in the range of 2 to 50 bar (0.3 to 5.0 MPa).

Aqueous emulsion polymerization can be carried out continuously in which, for example, monomers, water, optionally further emulsifiers, buffers and catalysts are fed continuously to a stirred reactor under optimum pressure and temperature conditions while the resulting emulsion or suspension is removed continuously. An alternative technique is batch or semibatch (semi-continuous) polymerization characterized by feeding the ingredients into a stirred reactor and allowing them to react at a set temperature for a specified length of time or by charging ingredients into the reactor and feeding the monomers into the reactor to maintain a constant pressure until a desired amount of polymer is formed. The polymerization can be carried out in a standard or conventional vessel used for emulsion polymerization of gaseous fluorinated monomers.

When conducting emulsion polymerization, perfluorinated, partially fluorinated, and hydrocarbon emulsifiers may be used, in addition to emulsifier-free polymerization. Generally these emulsifiers comprise from about 0.02% to about 3% by weight with respect to the polymer.

Fluorinated and partially fluorinated emulsifiers include those commonly used in emulsion polymerization of fluorine containing monomers. Examples of such emulsifiers include fluoroalkyl carboxylic acids and salts thereof having 6-20 carbon atoms, preferably 6-12 carbon atoms. Salts may include lithium-, sodium-, potassium- or ammonium salts of linear or branched perfluoro alkyl containing carboxylic and sulphonic acids having 4 to 11 carbon atoms in the alkyl chain. Specific examples include ammonium perfluoro octanoate (APFO), (described in U.S. Pat. No. 2,567,011), $C_8F_{17}SO_3Li$ which is commercially available from Bayer AG, $C_4F_9SO_3Li$ and $C_4F_9SO_3K$ (described in U.S. Pat. No. 2,732,398). A further example of a perfluoroalkyl containing carboxylic acid salt is $C_8F_{17}SO_2N(C_2H_5)CH_2COOK$. (See, e.g., U.S. Pat. No. 2,809,990).

Additional examples of such emulsifiers also include perfluorinated and partially fluorinated emulsifier having the formula $[R_f-O-L-COO^-]_iX^{i+}$ wherein L represents a linear partially or fully fluorinated alkylene group or an aliphatic hydrocarbon group, $R_f$ represents a linear partially or fully fluorinated aliphatic group or a linear partially or fully fluorinated aliphatic group interrupted with one or more oxygen atoms, $X^{i+}$ represents a cation having the valence i and i is 1, 2 or 3. (See, e.g. U.S. Pat. No. 2007/0015864). An example includes $CF_3O(CF_2)_3OCFHCF_2COONH_4$.

Additional examples of such emulsifiers also include perfluorinated polyether emulsifiers having the formula (I) or (II), where $CF_3-(OCF_2)_m-O-CF_2-X$ (I) wherein m has a value of 1 to 6 and X represents a carboxylic acid group or salt thereof, $CF_3-O-(CF_2)_3-(OCF(CF_3)-CF_2)_z-O-L-Y$ (II) wherein z has a value of 0, 1, 2 or 3, L represents a divalent linking group selected from $-CF(CF_3)-$, $-CF_2-$ and $-CF_2CF_2-$ and Y represents a carboxylic acid group or salt thereof. (See, e.g. U.S. Pat. Publ. No. 2007/0015865). An example includes $CF_3O(CF_2)_3OCF_2COONH_4$.

Further examples of such emulsifiers include perfluorinated polyether emulsifiers having the formula $R_f-O-(CF_2CF_2O)_mCF_2COOA$ wherein $R_f$ is $C_nF_{(2n+1)}$, where n=1-4, A is a hydrogen atom, an alkali metal or $NH_4$, and m is an integer of from 1 to 3. (See, e.g. U.S. Pat. No. 2006/0199898). Additional examples of such emulsifiers also include perfluorinated emulsifiers having the formula $F(CF_2)_nO(CF_2CF_2O)_mCF_2$ COOA wherein A is a hydrogen atom, an alkali metal or $NH_4$, n is an integer of from 3 to 10, and m is 0 or an integer of from 1 to 3. (See, e.g. U.S. Pat. Publ. No. 2007/0117915).

Additional examples of such emulsifiers include fluorinated polyether emulsifiers as described in U.S. Pat. No. 6,429,258 and perfluorinated or partially fluorinated alkoxy acids and salts thereof wherein the perfluoroalkyl component of the perfluoroalkoxy has 4-12 carbon atoms, preferably 7-12 carbon atoms. (See, e.g. U.S. Pat. No. 4,621,116).

Other exemplary emulsifiers include partially fluorinated polyether emulsifiers having the formula $[R_f-(O)_t-CHF-(CF_2)_n-COO-]_iX^{i+}$ wherein $R_f$ represents a partially or fully fluorinated aliphatic group optionally interrupted with one or more oxygen atoms, t is 0 or 1 and n is 0 or 1, $X^{i+}$ represents a cation having a valence i and i is 1, 2 or 3. (See, e.g. U.S. Pat. Publ. No. 2007/0142541).

More exemplary emulsifiers include perfluorinated or partially fluorinated ether containing emulsifiers are described in U.S. Pat. Publ. Nos. 2006/0223924, 2007/0060699, 2007/0142513 and 2006/0281946.

The perfluorinated, partially fluorinated and/or APFO-free emulsifiers can be removed or recycled from the fluoropolymers latex as described in U.S. Pat. Nos. 5,442,097, 6,613, 941, 6,794,550, 6,706,193 and 7,018,541.

In one aspect, the perfluoroelastomers of this disclosure comprise an end group represented by $-CF_3$, $-CF_2H$, $-CFH_2$, $-CH_3$, and combinations thereof. In some embodiments, $CF_3$, $-CF_2H$, $-CFH_2$, and $-CH_3$ comprises greater than 50% of the end groups of the perfluoroelastomer gum, greater than 75% of the end groups of the perfluoroelastomer gum, or may be the only detectable end group of the perfluoroelastomer gum.

The perfluoroelastomers having an end group represented by $-CF_3$, $-CF_2H$, $-CFH_2$, and $-CH_3$ may be obtained by polymerizing fluoropolymers in the presence of a perfluoroaliphatic sulfinate and a specified oxidizing agent. By perfluoroaliphatic herein is meant an alkyl, alkylene, alkenyl, or alkenylene groups which have one or two free valences which are bound to sulfinate groups. The perfluoroaliphatic group may be substituted with one or more functional groups, such as oxygen or heteroatoms, which do not interfere with the polymerization, such as one or more ether groups. The perfluoroaliphatic groups may contain 1 to 20 carbon atoms. Suitable perfluoroaliphatic groups include: perfluoro-n-alkyl, such as perfluoro-n-alkyl containing 1 to 10 carbon atoms, perfluoroalkyl, ω-hydroperfluoro-n-alkyl, $CF_2=CFOCF(CF_3)CF_2OCF_2CF_2-$, and perfluoro-n-alkenyl. Small amounts of hydrogen atoms may be present in the perfluoroalkyl groups, for example, $CF_3CH_2OCF_2CHFOCF_2CF(CF_3)OCF_2CF_2-$, $H_2FC(CF_2)_xCF_2-$, and $H(CF_2)_xCF_2-$ wherein x is 2 to 10.

The perfluoroaliphatic sulfinate may have the formula [(R$^1$SO$_2$)$_n$]$_q$M$_r$, wherein R$^1$ is perfluoroaliphatic, M is a cation of charge s and s is 1 or 2, and n is an integer of 1 or 2 and corresponds to the number of free valences of R', and r and q are 1 or 2. It is preferred that any, some or all of n, q, r, and s are 1, so long as the equation q·n=r·s is satisfied (so this compound is electrically neutral). When M is a metal or ammonium, the compound is a perfluoroaliphatic sulfinate, while when M is hydrogen, the compound is a perfluoroaliphatic sulfinic acid. M may be an alkali metal such as sodium or ammonium.

The specified oxidant for the perfluoroaliphatic sulfinate or sulfinic acid is a sulfate radical anion, generated from a persulfate salt, or bromate, chlorate, or hypochlorite salts with alkali metal or ammonium cations. The oxidant may be added as the designated compound or may be formed in situ during the polymerization process. (See, e.g., U.S. Pat. No. 5,639, 837).

Additionally, during polymerization, an anion selected from a chloride anion, a cyanate anion, a thiocyanate anion, or combinations thereof may optionally be added.

Perfluoroelastomer gums of this disclosure have low ratios of carbonyl-containing end groups.

It is known in the art to use heat treatment to achieve perfluoroelastomer gums which are substantially free of ionized or ionizable carbonyl-containing end groups. See for example, U.S. Pat. No. 5,936,060 (Schmiegel), which describes the polymerization of perfluorinated monomers and cure site monomers in the presence of a persulfate free radical initiator, followed by heat treatment to at least partially decarboxylate the perfluoroelastomer.

In contrast, the perfluoroelastomer gums of this disclosure have a low ratio of carbonyl-containing end groups due to the polymerization process. Subsequent heat treatment to reduce the carbonyl-containing end groups may not be necessary. For example, the amount of carbonyl-containing end groups is reduced when a suitable perfluorinated sulfinate and a suitable oxidizing agent are used, e.g., ammonium persulfate and ammonium perfluoroalkyl sulfinate. However, low levels of carbonyl-containing end groups may still be present on the resulting perfluoroelastomer gum as a result of competing initiation by the sulfate radical anion with the perfluorinated monomer, e.g. tetrafluoroethylene.

As described in Logothetis, *Progress in Polymer Science*, Vol. 14, 251-296 (1989), in thermal initiation using a persulfate initiator, the sulfate radical anion acts as the initiator in the presence of fluoromonomers and the resulting end groups are carboxylic acid groups resulting from the hydrolysis of water. In redox initiated systems, the initiation can take place with either the sulfate or sulfite radicals, resulting in the end groups being predominately carboxylate and sulfonate.

The perfluoroelastomer gums of this disclosure have end groups represented by —CF$_3$, —CF$_2$H, —CFH$_2$, —CH$_3$, and combinations thereof. These end groups are not obtained by typical thermal decomposition of perfluorinated polymers that have a plurality of carboxylate end groups as described by Schmiegel. A process as is described by Schmiegel temporarily converts these carboxylate end groups to acid fluoride end groups, which may be non-ionic end groups, but these acid fluoride end groups are slowly hydrolyzed by ambient water in the environment and as such are converted back to carboxyl end groups. The high temperature conversion of carboxylate end groups to acid fluoride end groups is described by Pianca, et al., *Journal of Fluorine Chemistry*, Vol. 95, 71-84, (1999).

In some embodiments, the perfluoroelastomer gum comprises end groups selected from at least one of the following: bromine, chlorine, iodine, and nitrile end groups.

In some embodiments, the perfluoroelastomer gum is substantially free of end groups selected from the following: a) ionizable or ionized end groups other than those have carbonyl-containing end groups, b) bromine, chlorine, iodine, and nitrile end groups, and c) COF end groups. With regard to group a) substantially free of ionizable or ionized end groups means that less than 5% of the polymer end groups present are ionized or ionizable. By ionized or ionizable end groups is meant acid end groups and end groups which are salts of acids. By substantially free of bromine, chlorine, and iodine end groups is meant that less than 0.01% weight bromine, chlorine, and iodine is present in the polymer end groups. By substantially free of nitrile end groups is meant that less than 0.01% weight nitrile is present in the polymer end groups. With regard to group c) substantially free of COF end groups is meant that the COF groups detectable by FTIR spectroscopy are less than 1%.

The COF end groups may be obtained by thermal decomposition of the carboxyl end groups or by the polymerization reaction. (See, e.g., Pianca, et al., *Journal of Fluorine Chemistry*, Vol. 95, 71-84, (1999)).

The compositions of this disclosure are perfluoroelastomer gums with low carbonyl-containing end groups. The carbonyl content of the perfluoroelastomer may be determined by an integrated absorbance ratio method based on Fourier transform infrared analysis (FTIR). Specifically, the total content of carboxyl, carboxylate, and carboxamide groups in the polymer is determined by measuring the integrated carbonyl absorbance (i.e., the total area of all peaks in the region 1620-1840 cm$^{-1}$) of thin polymer films using an FTIR spectrometer. In order to compare the carbonyl level in different polymer samples, integrated absorbance is normalized for differences in polymer film thickness by taking the ratio of the carbonyl integrated absorbance to the thickness band integrated absorbance. Thickness band integrated absorbance is the total area of all peaks in the region 2200-2740 cm$^{-1}$. The integrated absorbance of peaks in the latter region is proportional to the thickness of the polymer film. The polymers useful in this disclosure have an integrated absorbance ratio less than 0.08, less than 0.05, or even less than 0.01.

A peak height absorbance ratio method may also be used to determine the carboxyl, carboxylate, and carboxamide groups. This test relies on the baseline corrected integrated absorption underneath prominent peaks in the FT-IR spectrum of a pressed film of the perfluoroelastomer. In particular, the integrated absorbance of the most prominent peaks between approximately 1620 cm$^{-1}$ to 1840 cm$^{-1}$ are measured. These peaks correspond to absorbances attributable to carbonyl moieties present in the polymer. This baseline corrected integrated absorbance under the most intense peaks within the range of 1620 cm$^{-1}$ and 1840 cm$^{-1}$ is divided by the baseline corrected integrated absorbance of the C—F stretch overtone between 2220 cm$^{-1}$, and 2740 cm$^{-1}$, which is indicative of the thickness of the sample. This gives the carbonyl absorbance ratio which characterizes the carboxyl, carboxylate, and carboxamide content of the polymer.

In another embodiment, the polymers of this disclosure have a perfluoroelastomer with low levels of carbonyl fluoride end groups. By low level, this means the amount of carbonyl fluoride groups in the perfluoroelastomer gum is less than 10%, less than 5% or even less than 1% when analyzed by FTIR (1830-1900 cm$^{-1}$). In another embodiment, the perfluoroelastomer is substantially free of carbonyl fluoride end groups, which means, the amount of carbonyl fluoride groups in the perfluoroelastomer gum is less than 0.5% when analyzed by FTIR. The carbonyl fluoride end groups may be determined using the FTIR methods described above, with the exception that the most prominent carbonyl fluoride peaks occur at approximately 1848 cm$^{-1}$ and 1884 cm$^{-1}$, which correspond to the carbonyl fluoride stretches, as is known in the art.

In another embodiment, the perfluoroelastomers of this disclosure are not heat treated (i.e., heat is not used to decarboxylate the perfluoroelastomer gum) and are also free of COF end groups as determined by FT-IR (1830-1900 cm$^{-1}$). For purposes of this disclosure, non-heat-treated means the perfluoroelastomer is not subjected to temperatures 150° C. or higher, 175° C. or higher, 200° C. or higher, 225° C. or higher or even 250° C. or higher.

Nitrogen-containing cure site components enable curing the perfluoroelastomer gum to form the cured fluoroelastomers of this disclosure. Examples of monomers comprising nitrogen-containing groups useful in preparing fluoropolymers comprising a nitrogen-containing cure site include free-radically polymerizable nitriles, imidates, amidines, amides, imides, and amine-oxides.

Useful perfluorinated vinyl ethers that have nitrogen-containing cure sites include, for example, perfluoro(8-cyano-5-methyl-3,6-dioxa-1-octene); $CF_2\!\!=\!\!CFO(CF_2)_LCN$ wherein L is an integer from 2 to 12; $CF_2\!\!=\!\!CFO(CF_2)_uOCF(CF_3)CN$ wherein u is an integer from 2 to 6; $CF_2\!\!=\!\!CFO[CF_2CF(CF_3)O]_q(CF_2O)_yCF(CF_3)CN$ wherein q is an integer from 0 to 4 and r is an integer from 0 to 6; or $CF_2\!\!=\!\!CF[OCF_2CF(CF_3)]_rO(CF_2)_tCN$ wherein r is 1 or 2, and t is an integer from 1 to 4; and derivatives and combinations of the foregoing.

The perfluoroelastomer must contain a sufficient quantity of nitrogen functional groups which can act as cure sites for crosslinking reactions. In one embodiment, the nitrogen-containing functional group is a nitrile-containing group. Nitrile groups may be introduced by use of a nitrile-containing cure site monomer, i.e., the nitrile groups are introduced into the polymer during polymerization. However, other methods of introduction are also contemplated by this disclosure. Examples of a nitrile-containing cure site monomers include $CF_2\!\!=\!\!CFOCF_2(CF_2)_3CF_2CN$; $CF_2\!\!=\!\!CFOCF_2CF(CF_3)OCF_2CF_2CN$; or combinations thereof.

The amount of nitrogen-containing cure sites in a side chain position of the fluoropolymer generally is from about 0.05 to about 5 mole percent or even from 0.1 to 2 mole percent.

The fluoroelastomer gums may also contain halogen containing material that is capable of participation in a peroxide cure reaction. Typically the halogen is bromine or iodine. Suitable cure-site components include terminally unsaturated monoolefins of 2 to 4 carbon atoms such as bromodifluoroethylene, bromotrifluoroethylene, and iodotrifluoroethylene, and 4-bromo-3,3,4,4-tetrafluorobutene-1. Examples of other suitable cure site components include: $CF_2\!\!=\!\!CFOCF_2CF_2Br$, $CF_2\!\!=\!\!CFOCF_2CF_2CF_2Br$, and $CF_2\!\!=\!\!CFOCF_2CF_2CF_2OCF_2CF_2Br$. Preferably, all or essentially all of these components are ethylenically unsaturated monomers.

Curing agents are added to the perfluoroelastomer gum to crosslink the fluoropolymer. Generally, the effective amount of curative, which may include more than one composition, is at least about 0.1 parts curative per hundred parts of the curable composition on a weight basis, more typically at least about 0.5 parts curative per hundred parts of the curable composition. On a weight basis, the effective amount of curative is typically below about 10 parts curative per hundred parts of the curable composition, more typically below about 5 parts curative per hundred parts of the curable composition, although higher and lower amounts of curative may also be used.

Curing agents can include curatives and cure catalysts. Curing agents can include those known in the art including: peroxides, triazine forming curing agent, benzimidazole forming curing agent, benzoxazole forming curing agent, adipates, and acetates, among others. These curing agents may be used by themselves or in combination with another curing agent or curing agents.

Peroxides may also be utilized as curing agents. Useful peroxides are those which generate free radicals at curing temperatures. A dialkyl peroxide or a bis (dialkyl peroxide), which decomposes at a temperature above 50° C. is especially preferred. In many cases it is preferred to use a di-tertiarybutyl peroxide having a tertiary carbon atom attached to peroxy oxygen. Peroxides selected may include: 2,5-dimethyl-2,5-di(tertiarybutylperoxy)3-hexyne, and 2,5-dimethyl-2,5-di(tertiarybutylperoxy)hexane, dicumyl peroxide, dibenzoyl peroxide, tertiarybutyl perbenzoate, α,α'-bis(t-butylperoxy-diisopropylbenzene), and di[1,3-dimethyl-3-(t-butylperoxy)-butyl]carbonate. Generally about 1-3 parts of peroxide per 100 parts of perfluoroelastomer is used.

In one embodiment, the curing agent may be selected from triazine forming cure networks. Such curing agents include: an organotin compounds (such as propargyl-, triphenyl- and allenyl-, tetraalkyl-, and tertraaryl tin curatives); ammonia generating compounds (e.g., see U.S. Pat. No. 6,281,296; ammonium salts, such as ammonium perfluorooctanoate (e.g., see U.S. Pat. No. 5,565,512); and amidines (e.g., see U.S. Pat. No. 6,846,880); imidates (e.g., see U.S. Pat. No. 6,657,013), metalamine complexes (e.g., see U.S. Pat. No. 6,657,012), and hydrochloric salts (e.g., see U.S. Pat. No. 6,794,457).

In another embodiment, the fluoroelastomer compositions can be cured using one or more peroxide curatives along with the ammonia generating catalysts. The cure catalyst may comprise for example, a first component and a second component wherein the first component is represented by R'C$(CF_2R)_7O^-Q^+$, where $Q^+$ is a non-interfering organophosphonium, organosulfonium, or organoammonium cation; each R independently represents H, halogen, a hydrocarbyl group or a halogenated hydrocarbyl group, wherein at least one carbon atom of the hydrocarbyl group may be further substituted with one or more heteroatoms selected from N, O and S; R' represents H, a hydrocarbyl group or a halogenated hydrocarbyl group, wherein at least one carbon atom of the hydrocarbyl group may be further substituted with one or more heteroatoms selected from N, O and S; or any two of R or R' may together form a divalent hydrocarbylene group, wherein at least one carbon atom of the hydrocarbylene group may be further substituted by one or more heteroatoms selected from N, O, and S, and the second component is represented by [N≡CCFR"]$_b$Z, wherein each R" independently represents F or $CF_3$; b represents any positive integer; and Z represents a b-valent organic moiety free of interfering groups. See e.g., U.S. Pat. No. 7,294,677. Examples include: a reaction product of $CF_3OCF_2CF_2CN$ and tetrabutylphosphonium 2-(p-toluoyl)-1,1,1,3,3,3-hexafluoroisopropoxide; a reaction product of $CF_3OCF_2CF_2CN$ and tetrabutylammonium 2-(p-toluoyl)-1,1,1,3,3,3-hexafluoroisopropoxide; and combinations thereof.

A catalyst comprising one or more ammonia-generating compounds may be used to cause curing. Ammonia-generating compounds include compounds that are solid or liquid at ambient conditions but that generate ammonia under conditions of cure. Such compounds include, for example, hexamethylene tetraamine (urotropin), dicyan diamid, and metal-containing compounds of the formula: $A^{w+}(NH_3)_v Y^{w-}$, where $A^{w+}$ is a metal cation such as $Cu^{2+}$, $Co^{2+}$, $Co^{3+}$, $Cu^+$, $Ni^2$; w is equal to the valence of the metal cation; $Y^{w-}$ is a counterion, typically a halide, sulfate, nitrate, acetate or the like; and v is an integer from 1 to about 7.

Also useful as ammonia-generating compounds are substituted and unsubstituted triazine derivatives such as those of the formula:

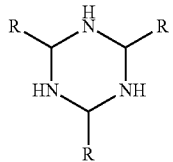

where R is a hydrogen or a substituted or unsubstituted alkyl, aryl, or aralkyl group having from 1 to about 20 carbon atoms. Specific useful triazine derivatives include: hexahydro-1,2,5-s-triazine and acetaldehyde ammonia trimer.

In one embodiment, the curing agent may be selected from the following:

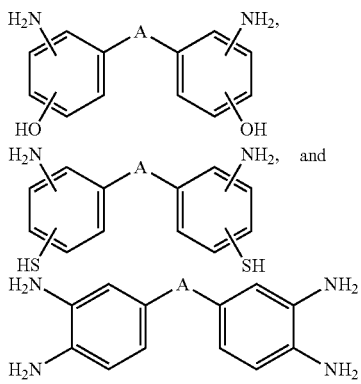

where A is $SO_2$, O, CO, alkyl of 1-6 carbon atoms, perfluoroalkyl of 1-10 carbon atoms, or a carbon-carbon bond linking the two aromatic rings, such as those disclosed in U.S. Pat. No. 6,114,452. For example, a useful curing agent may include bis(aminophenols), such as 2,2-bis[3-amino-4-hydroxyphenyl]hexafluoropropane; bis(aminothiophenols), such as 4,4'-sulfonylbis(2-aminophenol); and tetraamines, such as 3,3' diaminobenzidine; and 3,3',4,4'-tetraaminobenzophenone.

Bisamidrazone compounds for example, 2,2-bis(4-carboxyphenyl)hexafluoropropane bisamidrazone, and bisamidrazones and bisamidoximes may also be used as curing agents.

In another embodiment, curing agents (or precursors thereof) of the following formula may be used:

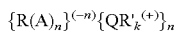

wherein R is a $C_1$-$C_{20}$ alkyl or alkenyl, $C_3$-$C_{20}$ cycloalkyl or cycloalkenyl, or $C_6$-$C_{20}$ aryl or aralkyl, which may be non-fluorinated, partially fluorinated, or perfluorinated or hydrogen. R can contain at least one heteroatom, i.e., a non-carbon atom such as O, P, S, or N. R can also be substituted, such as where one or more hydrogen atoms in the group is replaced with Cl, Br, or I. $\{R(A)_n\}^{(-n)}$ is an acid anion or an acid derivative anion, n is the number of A groups in the anion. A is an acid anion or an acid derivative anion, e.g., A can be COO anion, $SO_3$ anion, $SO_2$ anion, $SO_2NH$ anion, $PO_3$ anion, $CH_2OPO_3$ anion, $(CH_2O)_2PO_2$ anion, $C_6H_4O$ anion, $OSO_3$ anion, O anion (in the cases where R is hydrogen, aryl, or alkylaryl),

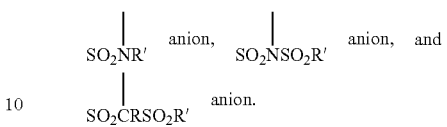

R' is defined as R (above), and a particular selection for R' may be the same or different from the R attached to A, and one or more A groups may be attached to R. Q is phosphorous, sulfur, nitrogen, arsenic, or antimony, and k is the valence of Q. When Q is nitrogen and the only fluoropolymer in the composition consists essentially of a terpolymer of tetrafluoroethylene, a perfluorovinylether, and a perfluorovinylether cure site monomer comprising a nitrile group, not every R' is H, and k is one greater than the valence of Q. (See, e.g., U.S. Pat. No. 6,890,995 and U.S. Pat. No. 6,844,388). Examples may include bistetrabutylphosphonium perfluoroadipate, tetrabutyl phosphonium acetate, and tetrabutyl phosphonium benzoate.

Other curing agents may include: bis-aminophenols (e.g., see U.S. Pat. Nos. 5,767,204 and 5,700,879); organometallic compounds (e.g., see U.S. Pat. No. 4,281,092); bis-amidooximes (e.g., see U.S. Pat. No. 5,621,145); aromatic amino compounds; bisamidrazones; bisamidoximes; and tetraphenyltin.

Depending on the cure site components present, it is also possible to use a dual cure system. For example, perfluoroelastomers having copolymerized units of nitrile-containing cure site monomers can be cured using a curing agent comprising a mixture of a peroxide in combination with organotin curative and a co-agent.

A co-agent (some times referred to as a co-curative) may be composed of a poly unsaturated compound which is capable of cooperating with the peroxide to provide a useful cure. These co-agents can be added in an amount equal to 0.1 and 10 phr (parts per hundred rubber), or even between 1 and 5 phr. The co-agent may be one or more of the following compounds: triallyl cyanurate; triallyl isocyanurate; tri(methylallyl) isocyanurate; tris(diallylamine)-s-triazine; triallyl phosphate; N,N-diallyl acrylamide; hexaallyl phosphoramide; N,N,N',N'-tetraallyl malonamide; trivinyl isocyanurate; 2,4,6-trivinyl methyltrisiloxane; and tri(5-norbornene-2-methylene)cyanurate. Particularly useful is triallyl isocyanurate.

Other useful co-agents include the bis-olefins. (See e.g., EP 0 661 304 A1, EP 0 784 064 and EP 0 769 521.)

Additives, such as carbon black, stabilizers, plasticizers, lubricants, fillers including silica and fluoropolymer fillers (e.g., PTFE and/or PFA (perfluoroalkoxy) fillers), and processing aids typically utilized in perfluoroelastomer compounding may be incorporated into the compositions of the present disclosure, provided they have adequate stability for the intended service conditions. In particular, low temperature performance can be enhanced by incorporation of perfluoropolyethers. (See e.g., U.S. Pat. No. 5,268,405.)

Carbon black fillers are used in elastomers as a means to balance modulus, tensile strength, elongation, hardness, abrasion resistance, conductivity and processability of the compositions. In cured perfluoroelastomer compositions, small particle size, high surface area carbon blacks have been the fillers of choice. Suitable examples include MT blacks (medium thermal black) designated N-991, N-660, N-908, and N-907, and large particle size furnace blacks. When used, 1-70 phr (parts per hundred rubber) of large size particle black is generally sufficient.

In addition, fluoropolymer fillers may also be present in the composition. Generally from 1 to 50 phr fluoropolymer filler is used, preferably at least about 5 phr fluoropolymer filler is present. The fluoropolymer filler can be any finely divided, easily dispersed plastic fluoropolymer that is solid at the highest temperature utilized in fabrication and curing of the perfluoroelastomer composition. By solid, it is meant that the fluoroplastic, if partially crystalline, will have a crystalline melting temperature above the processing temperature(s) of the perfluoroelastomer(s). Such finely divided, easily dispersed fluoroplastics are commonly called micropowders or fluoroadditives. Micropowders are ordinarily partially crystalline polymers.

Micropowders that can be used in the composition of this disclosure can include, but are not limited to, those based on the group of polymers known as TFE polymers. This group includes homopolymers of TFE (PTFE) and copolymers of TFE with such small concentrations of at least one copolymerizable modifying monomer that the resins remain non-melt fabricable (modified PTFE). The modifying monomer can be, for example, HFP, perfluoro(propyl vinyl) ether, perfluorobutyl ethylene, chlorotrifluoroethylene or another monomer that introduces side groups into the polymer molecule. The concentration of such copolymerized modifiers in the polymer is usually less than 5 mole %. The PTFE and modified PTFE resins that can be used in this invention include both those derived from suspension polymerization and emulsion polymerization.

If blends of fluoropolymers are desired, one useful route of incorporation is typically through blending the fluoropolymer latices in the selected ratio, followed by coagulation and drying.

The curable composition can typically be prepared by mixing one or more fluoropolymer(s), the catalyst, any selected additive or additives, any additional curatives (if desired), and any other adjuvants (if desired) in conventional rubber processing equipment. The desired amounts of compounding ingredients and other conventional adjuvants or ingredients can be added to the curable composition and intimately admixed or compounded therewith by employing any of the usual rubber mixing devices such as internal mixers, (e.g., Banbury mixers), roll mills, or any other convenient mixing device. The temperature of the mixture during the mixing process typically is kept safely below the curing temperature of the composition. Thus, the temperature typically should not rise above about 120° C. During mixing, it generally is desirable to distribute the components and adjuvants uniformly throughout the gum.

The fluoroelastomer gum mixture may be cured by any of the methods known to those skilled in the art and will typically include a curing agent such that the fluoroelastomer gum can be cured. The cure composition typically includes one or more components that cause the fluoropolymer chains to link with each other thereby forming a three dimensional network. Such components may include curing agents, such as catalysts, curatives, coagents, or combinations thereof.

Molding or press curing of the perfluoroelastomer gum mixture is typically conducted at a temperature sufficient to cure the mixture in a desired time under a suitable pressure. Generally this is between 95° C. and 230° C., or 150° C. and 205° C. for a period of time from 1 min to 15 hours or 5 min to 30 min. A pressure of between 700 kPa and 21,000 kPa is usually imposed on the mixture in a mold.

The molded mixture or press-cured article may then, optionally be post-cured (e.g., in the oven) at a temperature and for a time sufficient to complete the curing, usually between 150° C. and 300° C. or 230° C. for a period from 2 hr to 50 hrs or more generally increasing with the cross-sectional thickness of the article. For thick sections, the temperature during the post-cure is usually raised gradually from the lower limit of the range to the desired maximum temperature. The maximum temperature used is preferably about 300° C. and this value is held for 4 hrs or more. This post-cure step generally completes the cross-linking and may also release residual volatiles from the cured compositions. Finally, the press-cured articles are returned to ambient temperature such as by shutting off the oven.

The sealing properties of polymers can be determined using a technique known as Compression Stress Relaxation (CSR). CSR is a test method where a sample of a defined configuration (often a cylindrical shape) is compressed axially a certain amount, defined as a percent of its total height and noted as % compression or strain. When this is done, the counterforce exerted by the samples is measured at room temperature initially and over time after exposure to different environmental conditions. Since elastomers exhibit a viscoelastic response when they are initially compressed, the initial force it exerts decays with time to an equilibrium stable value. Because of this, the initial reading is taken a specific time period after the sample was compressed. In this case, it is done at a defined time, one hour after the sample is compressed. Once the initial sealing force has been determined, the sample can be exposed to defined controlled conditions such as elevated temperatures or exposure to oil or other fluids for specific period of time. After exposure to these conditions, the samples are cooled to room temperature and then checked again for sealing force. The sealing force determined after the exposures is compared to the initial sealing force to determine a ratio, which is reported as the % retained sealing force (% RSF). For sealing purposes it is desirable to maintain the highest % RSF after environmental exposure. Different materials are compared for this response after exposure to the same conditions and period of time.

A Load-Deflection response of the sample compressed in the CSR jig is used to determine sealing force. The samples are compressed in a CSR fixture between two flat rigid, but free floating shims. The cap screws in the jigs hold the clamping plate in a fixed position against the base that defines a working area. The hole through the clamping plate allows an indenter pin to sit on the top shim and apply a load to the compressed sample. Using a universal testing machine, a load is applied to the top shim through the indenter pin at a slow rate of 0.05 inches/min and deflected 0.004 inches to create a load vs. deflection curve. This curve allows one to determine the sealing force exerted by the sample. As force is applied through the indenter pin and top shim to overcome the counter force exerted by the sample, a load deflection response is measured. When this applied force exceeds the force exerted by the sample, the top shim will separate from the clamping plate and sample will begin to compress further. This results in a change in the slope of the response, which can be seen as an inflection point in the curve. Since this transition may not be completely sharp, the inflection point can be determined by creating tangent lines along the linear portions of the curve before and after the transition to determine the y-value of the intersection point of those two lines being used to define the sealing force.

The sealing force can be determined graphically by creating tangent lines to the two linear portions of the load deflection response curves. The intersection of these lines is used to determine the sealing force for the test. This can be done in an automated manner with the load frame software, or manually by printing out the curves and creating tangent lines graphically. The values of interest are the sealing force (load values (y-axis) at the intersection of the two lines), the slope of the initial line (System Stiffness), and the slope of the second portion of the line (Sample Stiffness), as well as the ratio of the two values (Stiffness Ratio=System Stiffness/Sample Stiffness). The % RSF values are then plotted against time and used to compare different materials. Further information on compression stress relaxation methods and comparisons can be found in SAE Technical Papers 2000-01-0752, 2001-01-0742, and 2003-01-0946.

Surprisingly, it is discovered that cured compositions according to this disclosure typically have enhanced RSF as compared to cured compositions that have higher levels of carbonyl-containing end groups.

The enhanced RSF is particularly important in the curable perfluoroelastomer compositions of the present disclosure, which can be used in production of gaskets, tubing, and seals. Such articles may be produced by molding a compound formulation of the curable perfluoroelastomer gum with various additives under pressure, curing the article, and then subjecting it to a post cure cycle. The cured compositions of this disclosure have excellent thermal stability and chemical resistance. The cured compositions are particularly useful as seals and gaskets for use in automotive, chemical processing, semiconductor, aerospace, and petroleum industry applications.

Advantages and embodiments of this invention are further illustrated by the following examples, but the particular materials and amounts thereof recited in these examples, as well as other conditions and details, should not be construed to unduly limit this invention. All materials are commercially available or known to those skilled in the art unless otherwise stated or apparent.

EXAMPLES

The preparation, of the fluoropolymer compositions of this disclosure are further described in the following examples. The particular materials and amounts thereof recited in these examples, as well as other conditions and details, should not be construed to unduly limit this invention. In these examples, all percentages, proportions and ratios are by weight unless otherwise indicated.

Test Methods
FTIR

Carbonyl content was conducted by integrated absorbance ratio of a FTIR spectrum of the fluoropolymer gum using the general methods described hereinabove. Analysis was performed using a Fa Nicolet DX510 FTIR spectrometer using OMNIC software (ThermoFisher Scientific, Waltham, Mass.).

NMR Analysis

NMR analysis was conducted on the polymer gums to determine their composition. The samples were prepared as follows: approximately 130 mg of the polymer was dissolved in approximately 1 mL of hexafluorobenzene solvent. The solutions then were spiked with 2-3 drops of $CFCl_3$. The solutions were transferred to NMR tubes and a 376 MHz 19F-NMR spectrum was obtained on a Varian UNITY plus 400 FT-NMR spectrometer (Varian Medical Systems, Palo Alto, Calif.) was used with a probe temperature of 75° C.

Mooney Viscosity

The Mooney viscosity values were measured in a similar manner as ASTM D 1646-06 Type A by a MV2000 instrument (available from Alpha Technologies, Ohio) using large rotor (ML 1+10) at 121° C. Results are reported in Mooney units.

VDA Compression Set

O-rings were placed in a stainless steel fixture and compressed at 25% deformation for 100 hrs at 150° C. and then, without releasing the compression, were held overnight at room temperature. The O-rings were removed from the stainless steel fixture and the compression set was measured. Shown in Table 1 is the average % compression set of three O-rings.

Retained Sealing Force

RSF was determined by monitoring the load-deflection response of the samples compressed in a Compression Stress Relaxation (CSR) jig. For each polymer example, three samples were tested. The polymer samples were compressed in a CSR centering jig (made-in house, Dyneon LLC, Oakdale, Minn.). The polymer samples were compressed in the jig between two flat rigid, but free, floating shims. A first shim was laid into the center of the jig and three centering wedges were used in the jig to line up the first shim so that the sample remained centered while the clamping plate was tightened. The test sample was lubricated by applying a small amount of silicone oil to the top and bottom surfaces of the sample and wiping the oil off with a paper towel. The sample was placed on top of the first shim, centered by the centering wedges. Based on the thickness of the first shim and the sample, a second shim thickness was selected to achieve a 25% compression. The second shim was placed on top of the sample, lined up with the sample and the first shim. The top of the jig was placed into position so that the jig was assembled the same way each time. The jig then was tightened.

Prior to testing, the temperature of the jig and room temperature was measured. The temperature of the sample contained within the jig was determined by placing a thermocouple into an access hole on the jig base. If the sample was aged in the oven, the sample and jig were allowed to cool to room temperature before analysis. A modified Instron 1125 tensometer with MTS TestWorks 4 software (MTS Systems Corp., Eden Prairie, Minn.) was used to run load deflection curves. The load cell was calibrated and the jig was centered into the loadframe. A load was applied to the top shim through an indenter pin at a rate of 0.05 inches/min (1.3 mm/min) and deflected at 0.004 inches (0.1 mm). Three deflections were run per sample with at least a 10 second pause between each deflection. Curves of load versus defection were plotted and the RSF (in Newtons) exerted by the polymer sample was determined graphically by creating tangent lines to the two linear portions of the load deflection response curves. The intersection of these lines was used to determine the RSF.

After the sample was placed in the CSR jig and compressed, the sample was left at room temperature for one hour, for the sample to stabilize. The sample was then tested to obtain the initial sealing force. Then, the polymer sample was left in the jig and aged at 200° C. (392° F.) in an oven. The retained sealing force was determined at 1, 24, and 72 hours. The aged results were then compared to the initial retained sealing force to determine the % retained sealing force. Shown in Table 1 is the average retained sealing force for three O-rings in Newtons (N). Shown in parenthesis is the % retained sealing force+/− the % standard deviation. Shown in Table 2 is the average retained sealing force for three buttons in N. Shown in parenthesis is the % retained sealing force+/− the % standard deviation.

$C_4F_9SO_7NH_4$ Preparation

A 3 L glass flask, equipped with thermometer, reflux condenser, addition funnel and stirrer was charged with deionized water (331 mL), sodium sulfite (88.9 g), sodium bicarbonate (104.8 g) and a trace amount of potassium perfluorobutyl sulfinate (1 g, prepared by neutralizing perfluorobutane sulfinic acid with potassium hydroxide). Under agitation, the flask was heated to 60° C., and the reactor was purged with nitrogen and kept under a nitrogen blanket.

Slowly, a small amount of perfluorobutyl sulfonyl fluoride (54 g) was dripped into the reactor, until the reaction starts, evidenced by outgassing and gently refluxed. Once the reaction started, the remainder of the perfluorobutyl sulfonyl fluoride (163.7 g) was added over about a 4 hour period. The reaction was continued overnight under gentle reflux at a batch temperature of 60° C. and good agitation.

Then, the batch was cooled to room temperature, and under cooling, concentrated sulfuric acid (340 g) was added, while assuring the batch maintained a temperature of 30 to 40° C. After all the sulfuric acid has been charged, the agitation was stopped and the batch was left to phase-split for about 1 hour. The bottom fluorochemical phase was collected and washed twice with deionized water (272 g) and concentrated sulfuric acid (167.8 g). The collected bottom fluorochemical phase was a clear, slightly yellow liquid which consisted mainly of perfluorobutyl sulfinic acid and water. This sulfinic acid was neutralized in situ with ammonium hydroxide to prepare ammonium perfluorobutyl sulfinate.

Bistetrabutylphosphonium Perfluoroadipate Preparation

A 2 L round bottom flask was equipped with magnetic stirring, a temperature probe, and connection to a nitrogen bubbler. The flask was charged with 188 g (0.65 mole) perfluoroadipic acid (made from octafluoroadipoyl fluoride available from SynQuest Laboratories, Inc., Alachua, Fla.) and 488 g of distilled water. While stirring, 898 g (1.3 mole) of a 40 wt % aqueous solution of tetrabutyl phosphonium hydroxide (available from Aldrich) was added over 1 hr. A slight exothermic reaction was observed. The mixture was stirred for another hour at room temperature (around 23° C.). The flask was heated to 65° C. under a reduced pressure of 15 ton (2 kPa) to remove water to give $(C_4H_9)_4POCO(CF_2)_4COOP(C_4H_9)_4$.

Polymer Gum A

Under oxygen-free conditions, a 150-liter (L) kettle was charged with 105 L deionized water. To the kettle, 520 g of $C_7F_{15}COONH_4$ (APFO) and 240 g $C_4F_9SO_2NH_4$ were added. After heating to 73° C., 1220 g tetrafluoroethene (TFE) and 3570 g perfluoromethylvinyl ether (PMVE) were added. $CF_2=CFOCF_2(CF_2)_3CF_2CN$ (122 g MV5CN) was added as preemulsion (as described in U.S. Publ. No. 2004/0024134). The reaction was initiated with addition of 180 g ammonium peroxodisulphate (APS) dissolved in 1100 mL deionized water. At 10 bar pressure and 73° C., 24.5 kg TFE, 20.4 kg PMVE, and 1.7 kg MV5CN (as preemulsion) were fed into the kettle over a period of 300 min. The resulting latex had a solid content of 31% and was coagulated with 450 g $MgCl_2$. The polymer was dried at 115° C.

The gum had an integrated absorbance ratio for the carbonyl-containing end groups of 0.096. The Mooney-Viscosity (1+10', 121° C.) was 86. The NMR analysis showed the following composition: 66.2 mole % TFE, 32.5 mole % PMVE, 1.05 mole % MV5CN and 0.24 mole % $CF_3$ end group.

Polymer Gum B

Under oxygen-free condition a 150-L kettle was charged with 105 L deionized water. To the kettle, 520 g $C_7F_{15}COONH_4$ (APFO), 203 g $C_4F_9SO_2NH_4$, and 73 g $NH_4Cl$ were added. After heating to 65° C., 2000 g TFE and 5820 g PMVE were added. MV5CN (140 g) was added as preemulsion (as described in U.S. Publ. No. 2004/0024134). The reaction was initiated with addition of 155 g APS dissolved in 1400 mL deionized water. At 14 bar pressure and 65° C. 24.5 kg TFE, 20.4 kg PMVE, and 1.7 kg MV5CN (as preemulsion) were fed over a period of 310 min. The resulting latex had a solid content of 32% and was coagulated with 450 g $MgCl_2$. The polymer was dried at 115° C.

The polymer gum had an integrated absorbance ratio for the carbonyl-containing end groups of 0.055. The Mooney-Viscosity (1+10', 121° C.) was 90. The NMR analysis showed the following composition: 65.1 mole % TFE, 33.6 mole % PMVE, 1.06 mole % MV5CN and 0.15 mole % $CF_3$ end group.

Polymer Gum C

Under oxygen-free condition a 150-L kettle was charged with 105 L deionized water. To the kettle, 620 g $CF_3O(CF_2)_3OCFHCF_2COONH_4$, 203 g $C_4F_9SO_2NH_4$ and 73 g $NH_4Cl$ were added. After heating to 65° C., 2.2 kg TFE and 5.6 kg PMVE were added. MV5CN (180 g) was added as a preemulsion (as described in U.S. Publ. No. 2004/0024134). The reaction was initiated with addition of 155 g APS dissolved in 1400 mL deionized water. At 14 bar pressure and 65° C. 24.4 kg TFE, 20.4 kg PMVE, and 1.7 kg MV5CN (as preemulsion) were fed into the kettle over a period of 310 min. The resulting latex had a solid content of 30% and was coagulated with 450 g $MgCl_2$. The polymer was dried at 115° C.

The polymer gum has an integrated absorbance ratio for the carbonyl-containing end groups of 0.075. The Mooney-Viscosity (1+10', 121° C.) was 61. The NMR analysis showed the following composition: 65.7 mole % TFE, 33.0 mole % PMVE, 1.10 mole % MV5CN and 0.17 mole % $CF_3$ end group.

Comparative Example 100 parts polymer gum A was compounded on a two roll mill with the addition of 15 parts carbon black (N550) and 1.5 parts fumed silica obtained under the trade designation "AEROSIL" (grade R972, Evonik Industries AG, Essen, Germany). Three parts of a 50% solution of bistetrabutylphosphonium perfluoroadipate in methanol was also added. The compounded mixture was molded into whole O-rings, 0.25 inch (6.4 mm) thick with a 0.5 inch (12.7 mm) diameter. The O-rings were press cured for 10 min at 188° C. followed by a post cure in air at 250° C. for 16 hrs. The VDA compression set resistance and RSF was tested as described above and the summarized results are shown in Table 1.

Example 1

100 parts polymer gum C was compounded on a two roll mill with the addition of 15 parts carbon black (N550) and 1.5 parts fumed silica R972. Three parts of a 50% solution of bistetrabutylphosphonium perfluoroadipate in methanol was also added. The compounded mixture was molded into whole O-rings, 0.25 inch (6.4 mm) thick with a 0.5 inch (12.7 mm) diameter. The O-rings were press cured for 10 min at 188° C. followed by a post cure in air at 250° C. for 16 hrs. The VDA compression set resistance and RSF was tested as described above and the summarized results are shown in Table 1.

TABLE 1

|  | Comparative Example 1 | Example 1 |
| --- | --- | --- |
| VDA Compression Set (%) | 74.6 | 60.3 |
| Retained Sealing Force-0 hr | 181 (100% ± 0.0%) | 183 (100% ± 0.0%) |

TABLE 1-continued

|  | Comparative Example 1 | Example 1 |
|---|---|---|
| Retained Sealing Force-1 hr aging | 35 (19.5% ± 11.2%) | 61 (33.7% ± 1.3%) |
| Retained Sealing Force-24 hr aging | 38 (16.8% ± 17.4%) | 57 (30.9% ± 2.2%) |
| Retained Sealing Force-72 hr aging | 36 (14.1% ± 14.2%) | 50 (27.2% ± 2.0%) |

As shown in Table 1, Example 1 made with the polymer gum having an integrated absorbance ratio for the carbonyl-containing end groups below 0.08 showed improvement in VDA compression set (under a 24 hr cool down) versus the Comparative Example after cure. Also shown in Table 1, is Example 1 made with the polymer gum having an integrated absorbance ratio for the carbonyl-containing end groups below 0.08, has improved retained sealing force after heat aging at 1, 24, and 72 hours.

Example 2

Polymer gum B was compounded on a two roll mill with the addition of a catalyst made by the reaction product of $CF_3OCF_2CF_2CN$ and tetrabutylphosphonium 2-(p-toluyl)-1,1,1,3,3,3-hexafluoroisopropoxide in a similar manner as described in U.S. Pat. No. 7,294,677 in a 1:1 mole ratio. The compounded mixture was molded into buttons, 0.25 inch (6.4 mm) thick with a 0.5 inch (12.7 mm) diameter. The buttons were press cured for 10 min at 177° C. followed by a stepped post cure in nitrogen. The post cure procedure was as follows: ramp from room temperature to 200° C. in 45 min, hold for 2 hr at 200° C., ramp from 200° C. to 250° C. in 30 min, hold for 2 hr at 250° C., ramp from 250° C. to 300° C. in 30 min, hold for 4 hr at 300° C. The RSF was tested as described above on three buttons and the summarized results are shown in Table 2.

Example 3

Polymer gum B was compounded on a two mill roll with the addition of bistetrabutylphosphonium perfluoroadipate (prepared as described above). The resulting polymer was molded into buttons, 0.25 inch (6.4 mm) thick with a 0.5 inch (12.7 mm) diameter. The buttons were press cured for 10 min at 188° C. and post cured at ambient pressure for 16 hrs at 250° C. The RSF was tested as described above on three buttons and the summarized results are shown in Table 2.

Example 4

Polymer gum C was compounded on a two roll mill with the addition of a catalyst made by the reaction product of $CF_3OCF_2CF_2CN$ and tetrabutylammonium 2-(p-toluyl)-1,1,1,3,3,3-hexafluoroisopropoxide in a 1:1 mole ratio. (The reaction product was made in a similar manner as described in U.S. Pat. No. 7,294,677. Briefly, tetrabutylammonium 2-(p-toluyl)-1,1,1,3,3,3-hexafluoroisopropoxide was charged into a round-bottom flask equipped with a stir bar and a dry ice condenser. The flask was cooled to 5° C. and then $CF_3OCF_2CF_2CN$ was added. A reaction occurred and the product was warmed to room temperature while maintaining a −78° C. condenser after which was allowed to warm to room temperature.) The resulting compounded mixture was molded into buttons, 0.25 inch (6.4 mm) thick with a 0.5 inch (12.7 mm) diameter. The buttons were press cured and post cured as described in Example 2. The RSF was tested as described above on three buttons and the summarized results are shown in Table 2.

Example 5

Polymer gum C was compounded on a two roll mill with the addition of a catalyst made by the reaction product of $CF_3OCF_2CF_2CN$ and tetrabutylphosphonium 2-(p-toluyl)-1,1,1,3,3,3-hexafluoroisopropoxide as described in U.S. Pat. No. 7,294,677 in a 1:1 mole ratio. The compounded mixture was molded into buttons, 0.25 inch (6.4 mm) thick with a 0.5 inch (12.7 mm) diameter. The buttons were press cured and post cured as described in Example 2. The RSF was tested as described above on three buttons and the summarized results are shown in Table 2.

TABLE 2

| Time (hr) | Retained Sealing Force | | | |
|---|---|---|---|---|
| | Example 2 | Example 3 | Example 4 | Example 5 |
| 0 | 216 (100% ± 0.0%) | 145 (100% ± 0.0%) | 212 (100% ± 0.0%) | 214 (100% ± 0.0%) |
| 1 | 94 (43.2% ± 3.0%) | 50 (33.3% ± 17.7%) | 89 (42.1% ± 2.0%) | 93 (43.5% ± 5.0%) |
| 24 | 65 (30.2% ± 3.7%) | 30 (19.8% ± 20.0%) | 75 (35.5% ± 3.9%) | 64 (29.9% ± 3.2%) |
| 72 | 56 (26.1% ± 1.7%) | 24 (15.8% ± 28.4%) | 59 (27.7% ± 13.0%) | 57 (26.6% ± 1.9%) |

Table 2 shows that the polymer gums with the integrated absorbance ratio for the carbonyl-containing end groups below 0.08 had retained sealing forces from 24N to 59N after heat aging at 1, 24, and 72 hours.

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A composition comprising:
    a perfluoroelastomer gum, which is thermally stable having (a) a nitrogen-containing cure site and (b) an end group represented by at least one of the following: —$CF_3$, —$CF_2H$, —$CFH_2$, and —$CH_3$;
    wherein an integrated absorbance ratio of carbonyl-containing end groups of the perfluoroelastomer gum is less than 0.08 before a heat treatment and about 16 hours after the heat treatment, the integrated absorbance ratio of carbonyl-containing end groups of the perfluoroelastomer gum is less than 0.08, wherein the heat treatment consists of heating the perfluoroelastomer gum for 30 minutes at 300° C.

2. The composition as in claim 1 wherein the perfluoroelastomer gum is a copolymer of tetrafluoroethylene and one or more perfluoro(alkyl vinyl)ether(s).

3. The composition as in claim 2 wherein the perfluoro (alkyl vinyl)ether is selected from $CF_3OCF_2CF_2CF_2OCF=CF_2$; $CF_3OCF=CF_2$; $CF_3CF_2OCF_2OCF=CF_2$; $CF_3CF_2CF_2OCF_2OCF=CF_2$; or combinations thereof.

4. The composition as in claim 1 wherein the nitrogen-containing cure site is a nitrile-containing cure site monomer.

5. The composition as in claim 4 wherein the nitrile-containing cure site monomer is selected from $CF_2=CFOCF_2(CF_2)_3CF_2CN$; $CF_2=CFOCF_2CF(CF_3)OCF_2CF_2CN$; or combinations thereof.

6. The composition as in claim 1 further comprising a curing agent.

7. The composition as in claim 6 wherein the curing agent is a triazine forming curing agent; a benzoxyzole forming curing agent; a benzimidazole forming curing agent; or combinations thereof.

8. The composition as in claim 6 wherein the curing agent is selected from 2,2-bis [3-amino-4-hydroxyphenyl] hexafluoropropane; 4,4'-sulfonylbis(2-aminophenol); 3,3'-diaminobenzidine; tetraphenyltin, bistetrabutylphosphonium perfluoro adipate; or combinations thereof.

9. The composition as in claim 6 wherein the curing agent is selected from a reaction product of
a first component represented by the formula

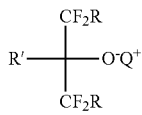

wherein $Q^+$ is a non-interfering organophosphonium, organosulfonium, or organoammonium cation; each R independently represents H, halogen, a hydrocarbyl group or a halogenated hydrocarbyl group, wherein at least one carbon atom of the hydrocarbyl group may be further substituted with one or more heteroatoms selected from N, O and S; R' represents H, a hydrocarbyl group or a halogenated hydrocarbyl group, wherein at least one carbon atom of the hydrocarbyl group may be further substituted with one or more heteroatoms selected from N, O and S; or any two of R or R' may together form a divalent hydrocarbylene group, wherein at least one carbon atom of the hydrocarbylene group may be further substituted by one or more heteroatoms selected from N, O, and S, and
a second component represented by the formula $[N=CCFR'']_bZ$, wherein each R'' independently represents F or $CF_3$; b represents any positive integer; and Z represents a b-valent organic moiety free of interfering groups.

10. The composition as in claim 9 wherein the curing agent is a reaction product of
$CF_3OCF_2CF_2CN$ and tetrabutylphosphonium 2-(p-toluoyl)-1,1,1,3,3,3-hexafluoroisopropoxide;
$CF_3OCF_2CF_2CN$ and tetrabutylammonium 2-(p-toluoyl)-1,1,1,3,3,3-hexafluoroisopropoxide;
or combinations thereof.

11. The composition as in claim 1 wherein the integrated absorbance ratio of carbonyl-containing end groups of the perfluoroelastomer gum is less than 0.05.

12. The composition as in claim 1 wherein the integrated absorbance ratio of carbonyl-containing end groups of the perfluoroelastomer gum is less than 0.01.

13. The composition as in claim 1 wherein the perfluoroelastomer gum is substantially free of at least one of the following:
a) ionizable or ionized end groups other than those having carbonyl-containing end groups;
b) bromine, chlorine, iodine, and nitrile end groups; and
c) COF end groups.

14. The composition as in claim 1 wherein the end group comprises greater than 50% of the end groups of the perfluoroelastomer gum.

15. The composition as in claim 1 wherein the perfluoroelastomer gum further comprises a bromine end group; a chlorine end group; an iodine end group; a nitrile end group; or combinations thereof.

16. An article comprising the cured composition of claim 1.

17. The article as in claim 16, wherein the article is a gasket; seal; or sheet.

18. A method of making a fluoropolymer comprising:
polymerizing in an aqueous solution at least one perfluorinated monomer and a nitrogen-containing cure site monomer in the presence of a suitable initiator, and an anion selected from a chloride anion, a cyanate anion, a thiocyanate anion or combinations thereof.

19. The method of making as in claim 18 wherein the initiator is
a perfluoroalkyl sulfinate and a suitable oxidizing agent capable of oxidizing the perfluoroalkyl sulfinate to a perfluoroalkyl sulfonyl radical, which subsequently generates a perfluoroalkyl radical; or
an organic peroxide.

20. The method of making as in claim 18 further comprising curing the fluoropolymer.

21. The method as in claim 19, wherein the oxidizing agent is selected from a persulfate, a bromate, a chlorate, a hypochlorite, or combinations thereof.

* * * * *

UNITED STATES PATENT AND TRADEMARK OFFICE
CERTIFICATE OF CORRECTION

PATENT NO. : 8,604,137 B2  
APPLICATION NO. : 12/919783  
DATED : December 10, 2013  
INVENTOR(S) : Grootaert et al.

Page 1 of 1

It is certified that error appears in the above-identified patent and that said Letters Patent is hereby corrected as shown below:

In the Specification

Column 7
Line 4, delete "R'," and insert -- $R^1$, --, therefor.

Column 10
Line 27, delete "tertraaryl" and insert -- tetraaryl --, therefor.
Line 39-40, delete "R'C(CF$_2$R)$_7$O$^-$Q$^+$" and insert -- R'C(CF$_2$R)$_2$O$^-$Q$^+$ --, therefor.
Line 59, delete "p-toluoyl" and insert -- p-toluyl --, therefor.
Line 61, delete "p-toluoyl" and insert -- p-toluyl --, therefor.

Column 16
Line 65, delete "C$_4$F$_9$SO$_7$NH$_4$" and insert -- C$_4$F$_9$SO$_2$NH$_4$ --, therefor.

Column 17
Line 38, delete "ton" and insert -- torr --, therefor.

In the Claims

Column 21
Line 13, in Claim 7, delete "benzoxyzole" and insert -- benzoxazole --, therefor.

Column 22
Lines 3-4, in Claim 10, delete "p-toluoyl" and insert -- p-toluyl --, therefor.
Line 5, in Claim 10, delete "p-toluoyl" and insert -- p-toluyl --, therefor.

Signed and Sealed this  
Fourteenth Day of October, 2014

Michelle K. Lee  
*Deputy Director of the United States Patent and Trademark Office*